US007269788B2

(12) United States Patent
Gharavy

(10) Patent No.: US 7,269,788 B2
(45) Date of Patent: Sep. 11, 2007

(54) EXTENSIBILITY AND USABILITY OF DOCUMENT AND DATA REPRESENTATION LANGUAGES

(75) Inventor: Shari Gharavy, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 310 days.

(21) Appl. No.: 09/896,140

(22) Filed: Jun. 29, 2001

(65) Prior Publication Data

US 2003/0074181 A1    Apr. 17, 2003

(51) Int. Cl.
 *G06N 3/00* (2006.01)
(52) U.S. Cl. .................................... 715/513
(58) Field of Classification Search ............. 715/513, 715/501.1, 523, 517, 530; 709/246, 203
See application file for complete search history.

(56) References Cited

U.S. PATENT DOCUMENTS

| | | | | |
|---|---|---|---|---|
| 5,299,304 | A | 3/1994 | Williams et al. | 715/523 |
| 5,369,732 | A | 11/1994 | Lynch et al. | |
| 5,515,524 | A | 5/1996 | Lynch et al. | |
| 5,708,798 | A | 1/1998 | Lynch et al. | |
| 5,825,651 | A | 10/1998 | Gupta et al. | |
| 5,878,400 | A | 3/1999 | Carter, III | |
| 5,893,109 | A | 4/1999 | DeRose et al. | 707/104.1 |
| 5,928,323 | A * | 7/1999 | Gosling et al. | 709/203 |
| 6,002,854 | A | 12/1999 | Lynch et al. | |
| 6,009,436 | A | 12/1999 | Motoyama et al. | 707/102 |
| 6,157,922 | A | 12/2000 | Vaughan | |
| 6,356,920 | B1 * | 3/2002 | Vandersluis | 715/501.1 |
| 6,535,896 | B2 * | 3/2003 | Britton et al. | 715/523 |
| 6,643,703 | B1 * | 11/2003 | Armistead et al. | 709/238 |
| 6,772,395 | B1 * | 8/2004 | Hyman et al. | 715/513 |

(Continued)

OTHER PUBLICATIONS

U.S. Appl. No. 08/780,600, Shah et al.

(Continued)

*Primary Examiner*—Stephen Hong
*Assistant Examiner*—Kyle R. Stork
(74) *Attorney, Agent, or Firm*—Hamilton & Terrile, LLP; Kent B. Chambers

(57) ABSTRACT

An application's XML parser requiring XML files conforming to a very simple DTD requires a user to create a verbose and very redundant XML input file. The verbose XML file is usually prone to errors if created by a novice user, or an entity not involved in the initial creation of the application and its parser. Thus, the present invention creates an input XML file conforming to the simple DTD from a grammar rich XML file provided by the user. The grammar rich XML file requires a complex DTD for transformation. The complex DTD may also be prone to error if created by the user, therefore, the complex DTD file is automatically created from a schema definition provided by the user, or an agency of the user. The user or an agent of the user defines a schema for the desired grammar level, and then through a series of XSL transformations, the complex DTD file is created. Also, a stylesheet used for transforming the user's grammar rich XML file is automatically created. The grammar rich XML file provided by the user conforms to the automatically created complex DTD file. Thus, the grammar used in defining the user interface to an application is extensible without any requirement to enrich and recompile the application's XML parser.

29 Claims, 3 Drawing Sheets

U.S. PATENT DOCUMENTS

| | | | |
|---|---|---|---|
| 6,772,413 | B2 | 8/2004 | Kuznetsov ................. 717/136 |
| 6,941,511 | B1 | 9/2005 | Hind et al. ................. 715/523 |
| 7,055,094 | B2 | 5/2006 | Imielinski et al. .......... 715/517 |
| 2002/0013792 | A1 | 1/2002 | Imielinski et al. .......... 715/523 |
| 2002/0062325 | A1 | 5/2002 | Berger et al. ............... 707/518 |
| 2002/0123993 | A1 | 9/2002 | Chau et al. ..................... 707/5 |
| 2003/0014414 | A1 | 1/2003 | Newman ..................... 707/10 |
| 2005/0055420 | A1 | 3/2005 | Wyler ........................ 709/217 |

OTHER PUBLICATIONS

U.S. Appl. No. 08/931,878, Gupta.
U.S. Appl. No. 09/081,857, Koppelman et al.
U.S. Appl. No. 09/163,752, Waugh et al.
U.S. Appl. No. 09/165,656, Gupta.
U.S. Appl. No. 09/253,427, Carter, III.
U.S. Appl. No. 09/413,963, Lynch et al.
U.S. Appl. No. 09/730,481, Vaughan.
U.S. Appl. No. 09/809,991, Chao et al.
U.S. Appl. No. 09/810,012, Chao et al.
U.S. Appl. No. 09/810,514, Chao et al.
U.S. Appl. No. 09/810,515, Zhou et al.
U.S. Appl. No. 09/810,519, Zhou et al.
U.S. Appl. No. 09/896,144, Gharavy.
Norman Walsh, XSL The Extensible Style Language [online]. Web Techniques, Jan. 1999 [retrieved on Feb. 11, 2001]. Retrieved from the Internet: <URL: http://www.webtechniques.com/archives/1990/01/walsh/>.
Selena Sol, What is a Markup Language [online]. Web Developer's Virtual Library, Mar. 8, 1999 [retrieved on Apr. 17, 2001]. Retrieved from the internet: <URL: http://wdvl.internet.com/Authoring/Languages/XML/Tutorials/Intro/what_is_markup_language>.
Selena Sol, What is XML [online]. Web Developer's Virtual Library, Mar. 8, 1999 [retrieved on Feb. 11, 2001]. Retrieved from the Internet: <URL: http://wdvl.internet.com/Authoring/Languages/XML/Tutorials/Intro/what_is_xml.html>.
Selena Sol, The Well-Formed Document [online]. Web Developer's Virtual Library, Mar. 29, 1999 [retrieved on Feb. 11, 2001]. Retrieved from the Internet: <URL: http://wdvl.internet.com/Authoring/Languages/XML/Tutorials/Intro/well_formed_doc.html>.
Selena Sol, Introducing the Valid XML Document and the DTD [online]. Web Developer's Virtual Library, May 3, 1999 [retrieved on Feb. 11, 2001]. Retrieved from the Internet: <URL: http://wdvl.internet.com/Authoring/Languages/XML/Tutorials/Intro/dtd_intro.html>.
XSLT, Xpath and XSL Formatting Objects [online]. Web Developer's Virtual Library [retrieved on Feb. 11, 2001]. Retrieved fom the Internet: <URL: http://wdvl.internet.com/Authoring/Languages/XSL/>.
Adam Rifkin, A Look at XML [online], [retrieved on Feb. 11, 2001]. Retrieved from the Internet: <URL: http://www.webdeveloper.com/xml/xml_a_look_at_xml.html>.
A Flexible Commission System to Improve Your Agency Relationships, CSC: Financial Services—S3+ Contracts and Commissions [online], [retrieved on Aug. 15, 2001]. Retrieved from the Internet: <URL: http://www.csc-fs.com/MARKETS/detail/pc_s3contracts.asp>.
PolicyLink Commission System, CSC: Financial Services [online], [retrieved on Aug. 15, 2001]. Retrieved from the Internet: <URL: http://www.csc-fs.com/MARKETS/detail/la_policylinkcomm.asp>.
Pictorial, Inc.—Insurance and Financial Services Training [online], Dec. 2, 2000 [retrieved on Aug. 16, 2001]. Retrieved from the Internet: <URL: http://www.pictorial.com/>.
What is AppointPAK? [online], [retrieved on Aug. 16, 2001]. Retrieved from the Internet: <URL: http://www.bisys-licensing.com/apptpak/whatis.htm>.
AppointPAK Features & Benefits [online], [retrieved on Aug. 16, 2001]. Retrieved from the Internet: <URL: http://www.bisys-licensing.com/apptpak/features.htm#buried>.
What is e-PAL? [online], [retrieved on Aug. 16, 2001]. Retrieved from the Internet: <URL: http://www.bisys-licensing.com/palvt/whatis.html>.
e-PAL Features & Benefits [online], [retrieved on Aug. 16, 2001]. Retrieved from the Internet: <URL: http://www.bisys-licensing.com/palvt/features.htm#source>.
Nine e-PAL Services, Features and Benefits [online], [retrieved on Aug. 16, 2001]. Retrieved from the Internet: <URL: http://www.bisys-licensing.com/palvt/serv.html#adjust>.
HRMS Enterprise Applications, Human Resources Management, PeopleSoft, Inc. [online], [retrieved on Aug. 16, 2001]. Retrieved from the Internet: <URL: http://www.peoplesoft.com/en/us/products/applications/hrm/HRMS/hrmsea/index.html>.
HRMS Collaborative Applications, Human Resources Management, PeopleSoft, Inc. [online], [retrieved on Aug. 16, 2001]. Retrieved from the Internet: <URL: http://www.peoplesoft.com/en/us/products/applications/hrm/HRMS/hrmsca/index.html>.
Financial Planning Made Easy, American Express, Financial Services [online], [retrieved on Aug. 16, 2001]. Retrieved from the Internet: <URL: http://finance.americanexpress.com/sif/cda/page/0,1641,4588,00.asp>.
Advice and Planning, American Express, Financial Services [online], [retrieved on Aug. 16, 2001]. Retrieved from the Internet: <URL: http://finance.americanexpress.com/sif/cda/page/0,1641,7569,00.asp>.
Why ContractMaker, And How Does It Work?, Legal Contracts, Digital Contracts, Inc., [online], [retrieved on Aug. 8, 2001]. Retrieved from the Internet: <URL: http://www.digicontracts.com/info/whyhow.html>.
Frequently Asked Questions, Digital Contracts, Inc., [online], [retrieved on Aug. 16, 2001]. Retrieved from the Internet: <URL: http://www.digicontracts.com/kits/faqs.html>.
Kathy Walrath, Mary Compione The JFC Swing Tutorial: "A Guide to Construction GUI's" ISBN # 0201433214. Book & CD Rom- Jul. 1999.
The JFC Swing Tutorial: http://java.sun.com/docs/books/tutorial/uiswing/TOC.html#start Sun Microsystems, Inc. 1995-2002.
The Java Tutorial: User Interfaces that Swing: A Quick Start: Layout Management http://java.sun.com/docs/books/tutorial/uiswing/mini/layout.html Sun Microsystems, Inc. 1995-2002.
The Java Tutorial: Swing Features and Concepts: Layout Management http://java.sun.com/docs/books/tutorial/uiswing/overview/layout.html Sun Microsystems, Inc. 1995-2002.
The Java Tutorial: Creating a GUI with JFC/Swing Lesson, Laying Out Components Within a Container, http//java.sun.com/docs/books/tutorial/uiswing/layout/index.html.—Sun Microsystems,. Inc. 1885-2002.
George Shepherd and Scot Wingo, MFC and Monikers, http://www.devx.com/premier/mgznarch/vcdj/1997/dec97/moniker1.asp Dec. 1997.
MSDN: Internet Development Index, URL Monikers Tutorial, http://msdn.microsoft.com/workshop/networking/moniker/moniker/asp.?frame=true Microsoft corporation, 2002.
MSDN: URL Monikers: Overview http://msdn.microsoft.com/workshop/networking/moniker/overview/overview.asp.Microsoft Corporation, 2002.
The COM Specification: Persistent Intelligent Names: Monikers, Chapter 11. Monikers (pp. 1-31), http://medg.lcs.mit.edu/ftp/emjordan/com/ch11%2mon.doc 1995, Microsoft Corporation.
Robin Cover: "The XML Cover Pages, XML Schemas" Feb. 19, 2002: http://www.oasis-open.org/cover/schemas.html (pp. 1-79).
Editor: James Clark: "W3C" "XSL Transformations (XSLT) Version 1.0" W3C Recommendation 16. Nov. 1999: http://www.w3.org/TR/1999/REC-sxlt-19991116 Copyright 1999 W3C. (pp. 1-110).
James Clark (editor), et al. Extensible Stylesheet Language (XSL), Professional XML. Wrox Press, Michael Kay. XLST, Programmer's Regerence. World Wide Web Consortium. 1998- Version 1.0—See http://www.w3.org/TR/1998/WD-xsl-19981216.

* cited by examiner

EXTENSIBILITY AND USABILITY OF DOCUMENT AND DATA REPRESENTATION LANGUAGES

FIELD OF THE INVENTION

This invention relates to the field of information and data processing technology. More specifically, the invention relates to extensibility and usability of languages used to represent documents and data for information and data processing.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF INVENTION

Extensible Markup Language (XML) is a human-readable, machine-understandable, general syntax for describing data such as hierarchical data. XML is an open standard for describing data developed under the auspices of the World Wide Web Consortium (W3C). XML is a subset of the Standard Generalized Markup Language (SGML) defined in ISO standard 8879:1986. It is a formal language that can be used to pass information about the component parts of a document from one computer system to another. XML is in general a method for putting structured data in a text file. XML consists of a set of rules and guidelines for designing text formats for such data in a way that produces files that are easily read by, for example, a data processing system such as a computer. XML can be used to describe components of a document (e.g. form, address books, spread sheets, financial transactions, technical drawings, etc.), and it is based on the concept of documents composed of a series of elements, entities, and attributes. Elements describe the meaning of the text they describe. Entities are normally external objects, such as graphics files, that are intended to be included in a document. Entities can also be internal and can serve various other purposes such representing reserved characters and user defined purposes. XML also provides a formal syntax for describing the relationships between the elements, attributes, and entities that make up an XML document, such a syntax can be used to recognize component parts of each document as explained in more detail below.

To allow a computer to check the structure of an XML document, generally users associate the document with a document type definition (DTD). A DTD is a set of rules that explains how to use an XML document. The DTD declares each of the permitted elements and attributes, defines entities, and specifies the relationships between them. XML gains its extensibility by allowing users to define the elements, attributes, and entities. By defining the role and attributes of each element of text in a formal model, i.e., the Document Type Definition (DTD), users of XML can check the validity of each component of the document. An XML DTD allows computers to check, for example, that users do not accidentally enter a third-level heading without first having entered a second-level heading, something that cannot be checked using the HyperText Markup Language (HTML) used to code documents that form part of the World Wide Web (WWW) of documents accessible through the Internet. However, XML does not restrict users to using DTDs.

To use a set of elements that have, for example, been defined by a trade association or similar body, users need to know how the elements are delimited from normal text and in which order the various elements should be used. Systems that understand XML can provide users with lists of the elements that are valid at each point in the document and will automatically add the required delimiters to the name to delineate the element. Where the data capture system does not understand XML, users can enter the XML elements manually for later validation. Elements and their attributes are entered between matched pairs of angle brackets (< . . . >) while entity references start with an ampersand and end with a semicolon (& . . . ;).

Because XML elements are based on the logical structure of the document they are somewhat easier to understand than physically based markup schemes of the type typically provided by word processors. As an example, a memorandum document coded in XML might look as follows:

```
<memo>
<to>All staff</to>
<from>R. Michael</from>
<date>April 1, 2001</date>
<subject>Bring Manuals</subject>
<text>Please bring your todo list with you to today's meeting.</text>
</memo>
```

As shown in the example above, the start and end of each logical element of the file has been clearly identified by entry of a start-tag (e.g. <to>) and an end-tag (e.g. </to>). This formatting is ideal for a computer to follow, and therefore for data processing.

A DTD associated with the XML example above could take the form:

```
<!DOCTYPE memo [
<!ELEMENT memo     (to, from, date, subject?, para+) >
<!ELEMENT para     (#PCDATA) >
<!ELEMENT to       (#PCDATA) >
<!ELEMENT from     (#PCDATA) >
<!ELEMENT date     (#PCDATA) >
<!ELEMENT subject  (#PCDATA) >
]>
```

This model indicates that a memorandum consists of a sequence of header elements, <to>, <from>, <date> and, optionally, <subject>, which must be followed by the contents of the memorandum. The content of the memo defined in this example consists of at least one paragraph (this is indicated by the + immediately after para ). In this simplified example a paragraph has been defined as a leaf node of the memo element and can contain parsed character data (#PCDATA), i.e. data that has been checked to ensure that it contains no unrecognized markup strings (i.e. text).

XML-coded files are suitable for communicating data to be stored in databases. Because XML files are both object-oriented and hierarchical in nature they can be adapted to many types of databases. A standardized interface to XML data is defined through W3C's Document Object Model (DOM), which provides a Common Object Request Broker Architecture (CORBA) interface definition language (IDL) interface between applications exchanging XML data.

XML is said to be "well formed" when it complies with well-known XML rules. If a well-formed XML document is associated with and conforms to a DTD, the document is said to be "valid". XML validation and well formedness can be checked using XML processors which are commonly referred as XML parsers. An XML parser checks whether an XML document is valid by checking that all components are present, and the document instance conforms to the rules defined in the DTD.

Most applications have an engine known as an XML parser that accepts XML documents as input data. These XML documents must be well-formed to be accepted by the XML parser, and, if the documents are associated with a DTD, they must be valid. Additionally, XML uses a number of "reserved" characters such as "<" and ">". To use these characters as character data, they must be treated in accordance with specific XML rules. Otherwise, the XML parser will reject the XML document or possibly misinterpret it. Other languages have their own requirements for format and syntax. Some languages and parsers are more forgiving than others, but violation of such requirements generally causes an error either via rejection or misinterpretation. Therefore, the more data that a document contains (i.e. the more verbose the document), such as an XML document, the higher the likelihood that the document will contain errors. In the case of an XML document, the more data contained in a document the higher the likelihood that the document will not be well-formed and/or will be invalid. Thus, when an XML document is too verbose, it becomes prone to errors during parsing. To avoid the inclusion and recurrence of errors, in many instances experts are employed to write the XML document and associated DTD. Additionally, to accommodate a verbose XML document, the elements and attributes (i.e. grammar) supported by the parser would have to be large. One of the proposed advantages of XML is its extensibility. However, if extensions of an XML document's grammar were desired, the parser would have to be recompiled to support the extended grammar. Thus, the parser would have to be very complex to accommodate a large variety of elements and attributes. Therefore, there is a need to maintain a fixed or reduced complexity of the parser while allowing extensibility of the grammar available to XML document authors.

Extensible Stylesheet Language (XSL)

Extensible Stylesheet Language (XSL) is a language for creating a style sheet that describes how data sent to a user using the Extensible Markup Language is to be presented. XSL is based on, and extends the Document Style Semantics and Specification Language (DSSSL) and the Cascading Style Sheet, level 1 (CSS1) standards. XSL provides the tools to describe exactly which data fields in an XML file to display and exactly where and how to display them. XSL consists of two parts: a language for transforming XML documents and an XML vocabulary for specifying formatting semantics. For example, in an XML page that describes the characteristics of one or more products from a retailer, a set of open and close element s that designate products manufacturers might contain the name of the product manufacturer. Using XSL, it is possible to dictate to a web browser application on a computer the placement of the manufacturer's name on a page and the display style of the manufacturer's name.

Like any style sheet language, XSL can be used to create a style definition for one XML document or reused for many other XML documents.

Extensible Stylesheet Language Transformation (XSLT)

Extensible Stylesheet Language Transformation (XSLT) is a language for transforming XML documents into other XML documents. The specification of the syntax and semantics of XSLT is developed under the auspices of W3C.

XSLT is designed for use as part of XSL. XSL describes the styling of an XML document that uses formatting vocabulary of an application and uses XSLT to describe how the document is transformed into another XML document that uses the formatting vocabulary. However, XSLT is also designed to be used independently of XSL.

SUMMARY OF INVENTION

Some computer programs are designed to accept data in the form of a structured input file. The data contained within the structured input file may, for example, provide the computer program with a set of processing parameters. For example, the structured input file may direct the computer program to operate in accordance with certain preferences and/or use certain data. Current systems designed to accept such input require that the user know how to formulate the input in a certain way. An example of a language that may be used to formulate input data is referred to by those of ordinary skill in the art as the eXtensible Markup Language (hereinafter XML). As described in the background section of this document, XML is a human-readable, machine-understandable, general syntax for describing data such as hierarchical data.

An embodiment of the invention provides users with a simplified and extensible mechanism for creating structured input files such as XML files. A computer program's XML parser typically requires that the user make a verbose XML file with redundant statements. In cases where the user is interfacing with a simplified Document Type Definition (herein after DTD), the XML files that are typically created can be overwhelmingly complex. This is particularly the case when the user is not intimately familiar with the specifics of XML. In such instances, the verbose XML file is usually prone to errors if created by a novice user or an entity not involved in the initial creation of the application and parser. Thus, an embodiment of the invention simplifies the initial input provided by the user. This enables novice users and other users who are unfamiliar with the initial specifics of the program to create an input XML file conforming to the simple DTD thus improving the usability of a structured input file. This is accomplished in one embodiment of the invention by using a grammar rich XML file (simplified XML file) provided by the user.

The grammar rich XML file, i.e., one conforming to the vocabulary of the user generally requires a complex DTD for transformation. The complex DTD may also be prone to error if created by the user therefore, an embodiment of the present invention creates this complex DTD file automatically from a schema definition provided by the user or an agent of the user.

In an embodiment of the present invention, the user or an agent of the user defines a schema for the desired grammar level, and then through a series of XSL transformations, the complex DTD file is created. Also, a stylesheet used for transforming the user's grammar rich XML file is automatically created. The grammar rich XML file provided by the user conforms to the automatically created complex DTD file. Thus, the grammar used in defining the user interface to an application is extensible without any requirement to enrich and recompile the application's XML parser.

DETAILED DESCRIPTION

Figure 1:
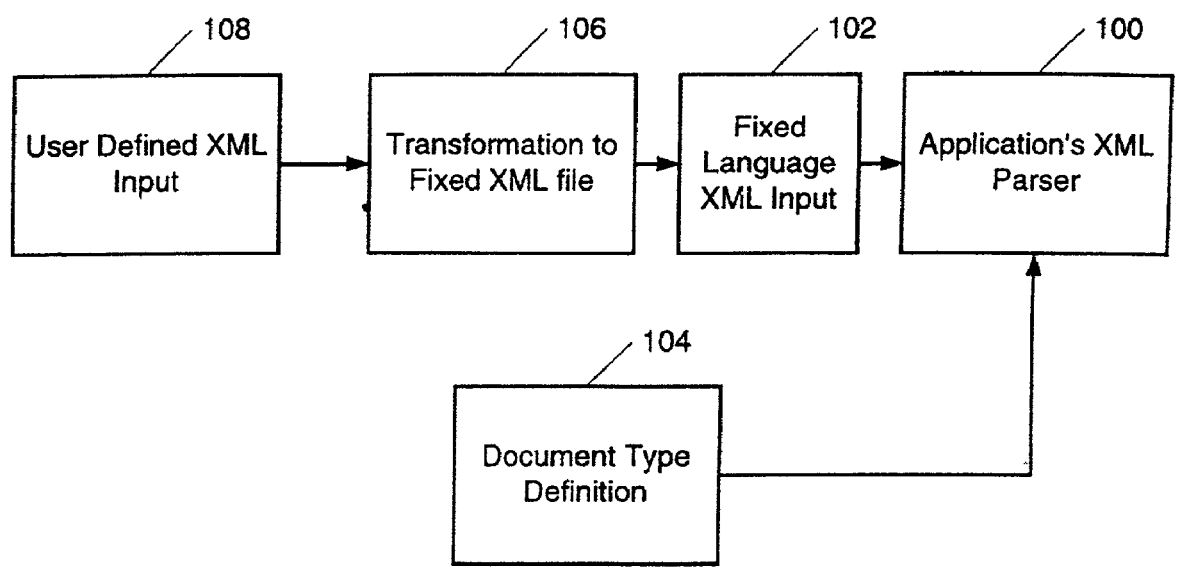
FIG. 1 is an illustration of the transformation process, in accordance with an embodiment of the present invention.

Embodiments of the invention provide users with a simplified yet extensible mechanism for providing input data to a computer program. For example, embodiments of the invention enable users to interface with an application in a way that reduces the complexity of providing data to application's document parser while allowing extensibility of the grammar available to the document authors without necessitating the recompilation of a parser application. An extensible grammar provides a rich language from which the document authors can organize data. An extensible grammar also provides authors the capability to create new elements and attributes as desired. In the following description, numerous specific details are set forth in order to provide a more thorough understanding of the invention. It will be apparent, however, to one skilled in the art, that the invention may be practiced without these specific details. In other instances, well-known features have not been described in detail in order to avoid unnecessarily obscuring the invention.

Applications that use XML documents as input usually require that certain grammar, i.e., one supported by the application's XML parser, be used in creating the XML document. When such application's XML parser parses the XML document in conformance to a very simple document type definition (DTD), the corresponding XML file that must be provided by the user is usually very verbose. For example, consider an application that has a fixed language XML definition as input with a very simple DTD as defined below:

```
Ruleengine.dtd
<?xml version="1.0" encoding="UTF-8"?>
<!--
    This DTD defines the schema for xml generated by the rule engine compiler
-->
<!ELEMENT rule-set (precondition, rule*)>
<!ATTLIST rule-set
    name CDATA #REQUIRED
    comment CDATA #REQUIRED
>
<!ELEMENT precondition (precondition-part*)>
<!ELEMENT precondition-part ((%method;)+, precondition-part*)>
<!ATTLIST precondition-part
    implementor CDATA #required
>
<!ENTITY % method (set-property)>
<!ELEMENT set-property (param+)>
<!ATTLIST set-property
    name CDATA #REQUIRED
>
<!ELEMENT param (%param-value;)>
<!ATTLIST param
    type CDATA #REQUIRED
>
```

-continued

```
<!ENTITY % param-value (constant|lookup)>
<!ELEMENT constant EMPTY>
<!ATTLIST constant
    value CDATA #REQUIRED
>
<!ELEMENT lookup EMPTY>
<!ATTLIST lookup
    enumeration CDATA #REQUIRED
    value CDATA #REQUIRED
>
<!ELEMENT rule (precondition, test, explanation?)>
<!ATTLIST rule
    comment CDATA #REQUIRED
>
<!ELEMENT test (test-part+)>
<!ELEMENT test-part ((%method;)+, test-part*)>
<!ATTLIST test-part
    implementor CDATA #REQUIRED
>
<!ELEMENT explanation EMPTY>
<!ATTLIST explanation
    message CDATA #REQUIRED
>
```

The XML document conforming to this DTD file will tend to be far too verbose and redundant for some users to understand. For example, fixedlang.xml below may represent a verbose XML file understood by the applications parser. This application's parser input requires a possibly novice user to be able to specify items such as the implementor for various test conditions. Thus, it is desirable to have a much less verbose XML that is easily understood by the user but provide a mapping from the less verbose XML, conforming to a possibly more complex DTD, to the version understood by the application's parser.

An embodiment of the invention achieves the same result (i.e., ultimate XML file) by either combining a simple DTD with a very complex and verbose XML file, or a complex and verbose DTD with a simple XML file. An embodiment of the present invention implements the latter because the question being addressed is user interface (i.e., ease of use). A novice user of the application could more easily write a simple, but grammar rich (i.e., one that uses fewer words to describe the same tasks) XML input file. However, more knowledge base (i.e., of the applications input requirements and XML syntax) is required when the requirement is for a complex and verbose XML file with appropriate calls to the proper java objects. An XML input file written by one not intimately familiar with the grammar of an application's parser and interfaces may be prone to fatal errors. Therefore, an embodiment of the present invention provides the user the capability to define the inputs to the application using a grammar rich (i.e., simple and understandable) XML file while an appropriate DTD file (i.e., complex and verbose DTD file) is automatically created that is in conformance with the user's XML file.

Thus, for example, an application that processes rules to determine if certain conditions are met before providing access to the application's functions may provide the user the flexibility to define the rules and required criteria for firing the application's functions. An example of such application is the Distributor Management System (DMS) described in pending U.S. application Ser. No. 09/809,991 entitled "A Framework For Processing Sales Transaction Data," specification of which is incorporated herein by reference.

The requirements in the ruleset of a DT) that are complex enough to provide extensibility (i.e., subject to modification)

in the grammar of the XML file created by the user may be defined through parameter entities as follows:

```
<!ENTITY % TESTS
  "(AND|OR|NOT|TRUE|FALSE|LICENSE_LINE_
    TEST|APPOINTMENT_TEST|BACKGROUND_
    CHECK_TEST|EO_TEST|LIABILITY_
    TEST|CONTINUING_EDUCATION_TEST)">
```

Each ruleset is defined as an element having a precondition and a rule. The rule is checked against the data provided by the user, and fires if the rule is satisfied. Otherwise, a message is returned to the user.

Each rule consists of the following elements: 1) a precondition which defines circumstances under which the rule applies, so that if the precondition is not satisfied, the rule does not apply; 2) a test such as a Boolean expression that determines if the rule is satisfied; and 3) an explanation which may be an optional message that explains the rule failure.

Precondition Element

The preconditions to a rule consist of a list of either generic preconditions or specialized preconditions (for example, a rule may apply to a particular product or jurisdiction) designed to cover common cases in the application. The following are various types of preconditions that may apply for a sales industry:

A product precondition is satisfied if the input refers to a given product specified in the precondition. This precondition maps to an object class (e.g., ProductName).

A product class precondition is satisfied if the input refers to a product that has the class specified in the precondition. This precondition maps to an object class (e.g., Product-.ProductClass).

A jurisdiction set precondition is satisfied if the input refers to one of a set of jurisdictions specified in the precondition.

A jurisdiction precondition is satisfied if the input refers to a jurisdiction specified in the precondition. Jurisdictions may be defined as<enum id="Jurisdiction">.

A start date precondition is satisfied if the date of the input is later than or equal to the date specified.

An end date precondition is satisfied if the date of the input is earlier than to the date specified.

A generic precondition is useful when more specific preconditions are inadequate. It is satisfied if the specified property on the specified input object has the specified value.

Test Element

All TESTs must evaluate to True for the test to succeed. Tests can be further combined using standard Boolean operators AND, OR, and NOT. Typical tests for an insurance industry sales distribution force may be as follows:

The license line test is satisfied if the distributor referred to by the input has the specified license line in the specified jurisdiction. For example: does John Smith have a Series 66 license for California?

The appointment test is satisfied if the distributor referred to by the input has the specified appointment in the specified jurisdiction. For example: is John appointed for Variable Life in New York?

The background check test is satisfied if the distributor referred to by the input has passed the specified background check with the specified decision.

The errors and omissions test is satisfied if the distributor referred to by the input has the specified level of errors and omissions coverage.

The liability test is satisfied if the distributor referred to by the input has the specified level of liability coverage.

The continuing education test is satisfied if the distributor referred to by the input has the specified number of continuing education credit hours.

A generic test is useful when more specific tests are inadequate. It is satisfied if the specified property on the specified input object has the specified value.

TRUE and FALSE tests are occasionally useful, representing tests that are either always or never satisfied.

Explanation Element

The explanation element is optional. It returns a message to the user when a rule fails to fire.

In an embodiment of the present invention, the mapping from a much less verbose XML to the version understood by the application's XML parser is accomplished by first defining a schema for the more complex DTD. As used herein, a schema is a type of framework or plan for implementing a task, for example. This schema is defined in an XML file conforming to a second DTD file, hereinafter called schema.dtd. This XML file is then used to generate the complex DTD file (i.e., DTD with the rich grammar as desired by the user) and an XSL file. The generated XSL file is used to transform XML conforming to the complex DTD to an XML conforming to the simple DTD presented above (i.e., ruleengine.dtd).

FIG. 1 is an illustration of the transformation process, in accordance with an embodiment of the present invention. The application's XML parser 100 expects input 102 to have a fixed format conforming to simple DTD 104. Parser 100 understands a fixed grammar and thus would complain about a fatal error and may stop processing when XML input (i.e, fixed language) 102 fails to comply with that fixed grammar. Thus regardless of the grammar used in user input 108, XML input 102 must comply with the grammar understood by parser 100. Therefore, an embodiment of the present invention translates user input XML 108 using transformation processes defined at block 106 to generate fixed language XML input 102. The grammar in XML input file 108 is not constrained by application's parser 100, thus it is extensible. This means that a user organization is free to define its preferred format and language for user input XML file 108.

Figure 2:
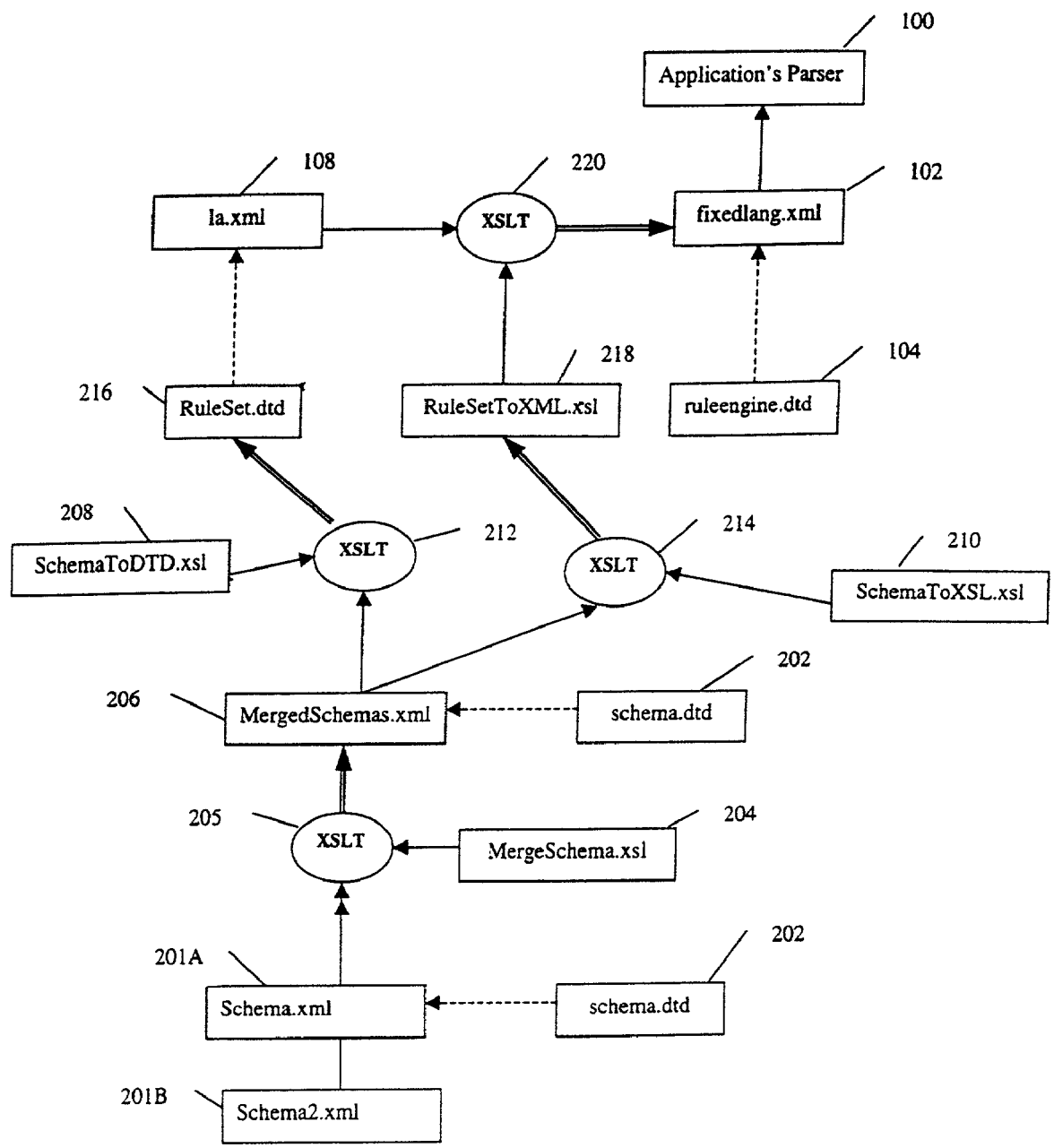
FIG. 2 is a detailed illustration of the transformation process in accordance with an embodiment of the present invention.

FIG. 2 is a detailed illustration of the transformation process in accordance with an embodiment of the present invention. The file names in the boxes correspond to sample files used herein to illustrate the transformation. Also, solid arrows indicate input, double arrows indicate generated files, and dashed arrows represent the relationship between an XML file and its DTD. In one embodiment, in order to have an extensible rich language user input XML file 108 (e.g., la.xml), the document type definition file 216 (e.g., RuleSet-.dtd) must be very complex and would be prone to error if written manually for every modification of the grammar. Thus, an embodiment of the present invention generates the document type definition file 216 (e.g., RuleSet.dtd) and stylesheet file 218 (e.g., RuleSetToXML.xsl) automatically based on a schema defined for the grammar. The schema definition generally contains enough information that the application's parser 100 is able to construct the correct runtime representation of the object tree, regardless of the complexity of the rich grammar. Thus, an embodiment of the present invention creates an in-memory hierarchy of objects representing elements defined by the simple XML format 102 (e.g., fixedlang.xml). Generally, these elements may require implementers which are the fully qualified names of the java classes that implement the interfaces to the objects. For example, the DTD presented above specifies two main element types, precondition-part and test-part, which may map to selected object interfaces.

Other embodiments of the invention may, for example, automatically generate machine independent codes (e.g., java codes) from the in-memory hierarchy of objects created after translation of the fixed XML file 102 by the parser. This may be accomplished, for example, by attaching an automatic code generation system to the application.

Generation of the fixed XML 102 (e.g., fixedlang.xml) is accomplished by first defining a schema (also used interchangeably with "framework") for the more complex DTD file 216 (e.g., RuleSet.dtd). This schema is defined as one or more XML files conforming to schema.dtd 202. For example, XML files schema.xml 201A and schema2.xml 201B define the grammar as desired by the user in conformance with schema.dtd. . The one or more schema files (e.g., 201A-201B) are merged and transformed by XSLT block 205 using stylesheet MergeSchema.xsl 204 to generate MergedSchemas.xml 206. Thus, MergedSchemas.xml 206 defines the schema for the desired complex DTD RuleSet 216. Notice that MergedSchemas.xml 206 also conforms to schema.dtd 202. In an embodiment, the user may use an agent, such as a consultant, to generate the schema files for the desired grammar level.

To provide the more complex DTD 216 for the defined schema, a stylesheet (e.g., SchemaToDTD.xsl 208) is provided and used by transformation engine XSLT 212 to automatically generate the complex DTD (e.g., Ruleset.dtd 216) from the combined schema (e.g., MergeSchemas.xml 206). Thus XSLT 212 creates an XML file which is the complex document type definition (DTD) needed for the grammar rich user input file la.xml 108. The invention also provides a stylesheet (e.g., SchemaToXSL.xsl 210) used by transformation engine XSLT 214 to create the stylesheet (e.g., RuleSetToXML.xsl 218) for the grammar rich document (e.g., la.xml 108) generated by the user.

The grammar rich XML file (e.g., la.xml 108), typically defined by the business user, conforms to the generated complex DTD (e.g., Ruleset.dtd 216) because it is based on the user defined schema. Finally, the transformation engine XSLT 220 transforms the user input XML file having rich grammar (e.g., la.xml 108) using the automatically generated stylesheet (e.g., RuleSetToXML.xsl 218) to generate the fixed language XML file (e.g., fixedlang.xml 102) which conforms to document type definition (e.g., ruleengine.dtd 104) understood by the application's parser 100. Thus, the generated fixed language XML file (e.g., fixedlang.xml 102) is understood by the application's parser 100 and should not result in fatal errors during processing.

AN EXAMPLE

In an example of the processes of an embodiment of the present invention, assuming a user desires to create the fixed XML file shown below (e.g., fixedlang.xml) for an application conforming to the ruleengine.dtd of the example above.

```
fixedlang.xml
<?xml version="1.0" encoding="UTF-8"?>
<rule-set name="" comment="">
    <precondition>
    <rule comment="">
        <precondition>
            <precondition-part
implementor="com.trilogy.fs.dms.ruleEngine.core.preconditions.Jurisdict
ionPreconditionPart">
```

-continued

```
                <set-property name="Jurisdiction">
                    <param type="int">
                        <lookup enumeration="Jurisdiction"
value="CA"/>
                    </param>
                </set-property>
            </precondition-part>
        </precondition>
        <test>
        </test>
    </rule>
</rule-set>
```

This input file may be too complicated for the novice user to create. For example, the novice user must know which "implementor", i.e., java object, to call for the precondition-part object. The present invention provides a method for the novice user to obtain the same XML file using a much richer language. In an embodiment, the user initially defines a schema for the desired grammar. As previously discussed, the schema may be created by an industry group, a consultant hired by the user, the Information Technology (IT) department of the user's corporation, etc. An example schema file is as follows:

As shown, the schema contains references to the necessary implementors for the preconditions and tests, which are generally of no interest to the novice user. Thus, the user only defines the simple XML file (i.e., la.xml) shown below instead of attempting to create the fixed XML file (e.g., fixedlang.xml) required by the application's parser.

```
la.xml
<!DOCTYPE RULE_SET SYSTEM "RuleSet.dtd">
<RULE_SET>
    <RULE>
        <PRECONDITION>
            <JURISDICTION jurisdiction = "CA"/>
        </PRECONDITION>
        <TEST>
        </TEST>
    </RULE>
</RULE_SET>
```

As shown, the schema contains references to the necessary implementors for the preconditions and tests, which are of no interest to the novice user. Thus, the user only need define the simple XML file (i.e., la.xml) shown above instead of attempting to create the fixed XML file (e.g., fixedlang.xml) required by the application's parser.

Program listings for the transformation files of an embodiment of the present invention are included in Appendix A, which comprises: schema.dtd; MergeSchema.xsl; Schema-ToXSL.xsl; and SchemaToDTD.xsl. Appendix A provides documentation for Extensible Schema Definition as described in this specification. Appendix A as provided on two CD-R compact discs entitled "Copy 1"and "Copy 2", each containing one ascii text file named "codesections.txt", created on Jun. 29, 2001, and having a size of 12, 000 bytes.

Embodiment of Computer Execution Environment (Hardware)

Figure 3:
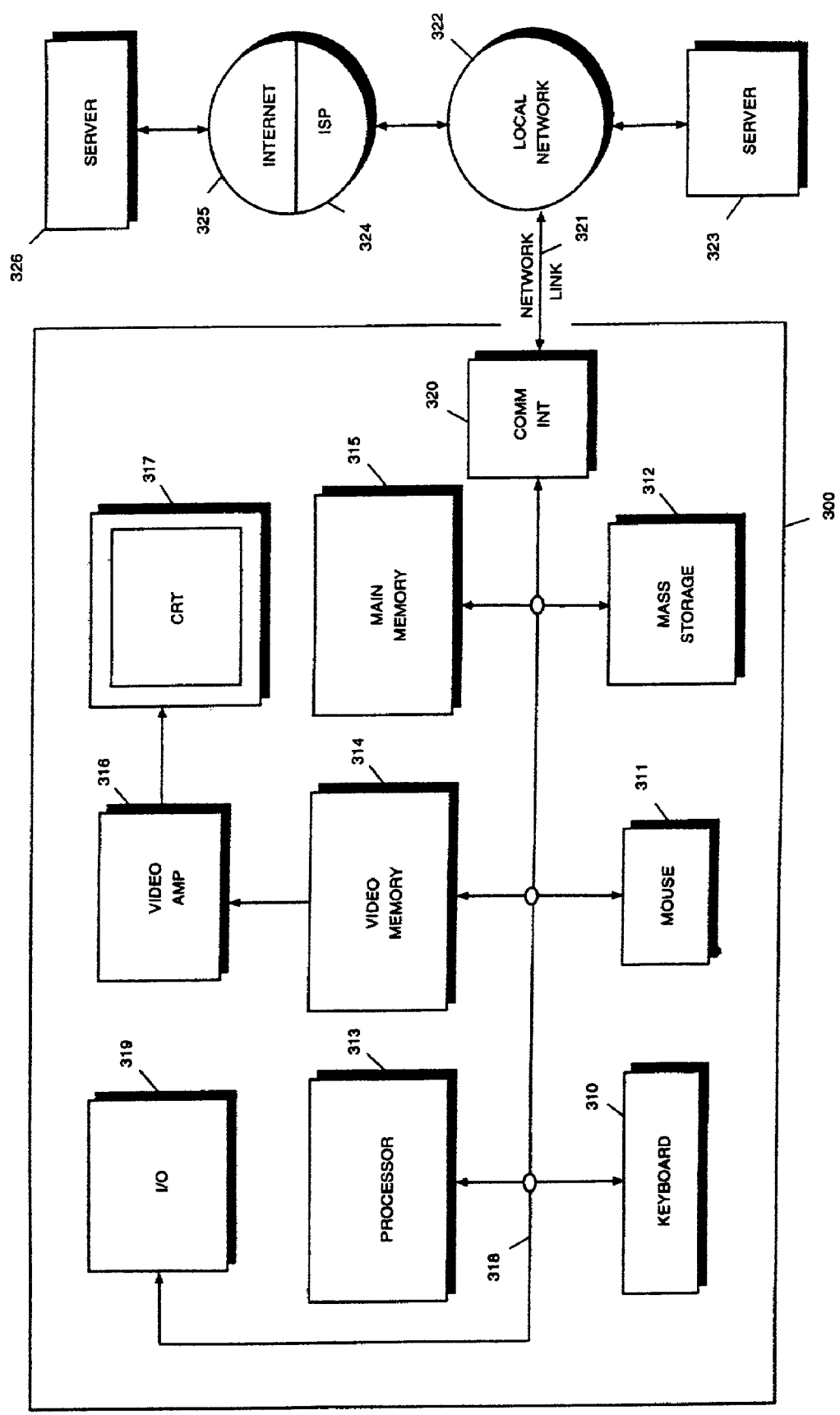
FIG. 3 is a block diagram of one embodiment of a computer system capable of providing a suitable execution environment for an embodiment of the invention.

An embodiment of the invention can be implemented as computer software in the form of computer readable code executed on any computer processing platform, or in the form of software (e.g., bytecode class files) that is executable within a runtime environment running on such a processing platform. An embodiment of the invention may be implemented in any type of computer system or programming or processing environment, including embedded devices (e.g., web phones, set-top boxes, etc.) and "thin" client processing environments (e.g., network computers (NC's), etc.). An example of a general computer system is illustrated in FIG. 3. The computer system described below is for purposes of example only.

In FIG. 3, keyboard 310 and mouse 311 are coupled to a system bus 318. The keyboard and mouse are for introducing user input to the computer system and communicating that user input to processor 313. Other suitable input devices may be used in addition to, or in place of, the mouse 311 and keyboard 310. I/O (input/output) unit 319 coupled to system bus 318 represents such I/O elements as a printer, A/V (audio/video) I/O, etc.

Computer 300 includes a video memory 314, main memory 315 and mass storage 312, all coupled to system bus 318 along with keyboard 310, mouse 311 and processor 313. The mass storage 312 may include both fixed and removable media, such as magnetic, optical or magnetic optical storage systems or any other available mass storage technology. Bus 318 may contain, for example, address lines for addressing video memory 314 or main memory 315. The system bus 318 also includes, for example, a data bus for transferring data between and among the components, such as processor 313, main memory 315, video memory 314 and mass storage 312. Alternatively, multiplexed data/address lines may be used instead of separate data and address lines.

In one embodiment of the invention, the processor 313 is a SPARC™ microprocessor from Sun Microsystems, Inc. or a microprocessor manufactured by Intel, such as the 80×86, or Pentium processor, or a microprocessor manufactured by Motorola, such as the 680×0 processor. However, any other suitable microprocessor or microcomputer may be utilized. Main memory 315 is comprised of dynamic random access memory (DRAM). Video memory 314 is a dual video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images. Alternatively, the video memory could be used to drive a flat panel or liquid crystal display (LCD), or any other suitable data presentation device. Computer 300 may also include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Communication interface 320 could also be a cable modem or wireless interface. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by an Internet Service Provider (ISP) 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Computer 300 can send messages and receive data, including program code, through the network(s), network link 321, and communication interface 320. In the Internet example, remote server computer 326 might transmit a requested code for an application program through Internet 325, ISP 324, local network 322 and communication interface 320.

The received code may be executed by processor 313 as it is received, and/or stored in mass storage 312, or other non-volatile storage for later execution. In this manner, computer 300 may obtain application code in the form of a carrier wave. Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Thus, a method and apparatus for providing extensible definition of rules using XML for applications with limited grammar have been described in conjunction with one or more specific embodiments. The invention is defined by the claims and their full scope of equivalents.

What is claimed is:

1. An extensible method for simplifying input provided to a computer program comprising:
   receiving a framework for a first grammar level;
   performing a first transformation of said framework to generate a first set of rules relating to interpretation of said first grammar level, wherein the first set of rules are based on a schema of the framework defined for the first grammar level;
   performing a second transformation of said framework to generate a first presentation style for said first grammar level;
   obtaining a user defined input in said first grammar, said user defined input conforming to said first set of rules and said framework; and
   applying said first set of rules and said first presentation style to said user defined input to generate an output in a second grammar level conforming to document rules of an application parser.

2. The method of claim 1, wherein said creating a framework comprises:
   creating one or more files having grammar definitions conforming to a second set of rules; and
   transforming said one or more files into said framework using a second presentation style conforming to said framework.

3. The method of claim 1, wherein said first transformation is in accordance with a third presentation style.

4. The method of claim 1, wherein said second transformation is in accordance with a fourth presentation style.

5. The method of claim 1, wherein said first grammar of said user defined input is extensible.

6. The method of claim 1, wherein said second grammar understood by said application's parser is fixed.

7. The method of claim 1, wherein said data representation language is extensible markup language (XML).

8. A computer readable product comprising:
a computer readable medium having a computer readable product comprising a computer readable document embodied therein, said computer readable document utilized for input into a rule engine, said computer readable document created by performing a method comprising:
receiving a framework for a first grammar level;
performing a first transformation of said framework to generate a first set of rules relating to interpretation of said first grammar level, wherein the first set of rules are based on a schema of the framework defined for the first grammar level;
performing a second transformation of said framework to generate a first presentation style for said first grammar level;
obtaining a user defined input in said first grammar, said user defined input conforming to said first set of rules and said framework; and
applying said first set of rules and said first presentation style to said user defined input to generate an output in said document, said output conforming to a second grammar level conforming to document rules of an application parser.

9. The computer readable product of claim 8, wherein said creating a framework comprises:
creating one or more files having grammar definitions conforming to a second set of rules; and
transforming said one or more files into said framework using a second presentation style conforming to said framework.

10. The computer readable product of claim 8, wherein said first transformation is in accordance with a third presentation style.

11. The computer readable product of claim 8, wherein said second transformation is in accordance with a fourth presentation style.

12. The computer readable product of claim 8, wherein said first grammar of said user defined input is extensible.

13. The computer readable product of claim 8, wherein said second grammar understood by said application's parser is fixed.

14. The computer readable product of claim 8, wherein said data representation language is extensible markup language (XML).

15. A computer program product comprising:
a computer readable medium having computer program code for extensibly simplifying input provided to a computer program embodied therein, said computer program code configured to cause a computer to:
receive a framework for a first grammar level, wherein said framework comprises a schema;
perform a first transformation of said framework to generate a first set of rules relating to interpretation of said first grammar level, wherein the first set of rules are based on a schema of the framework defined for the first grammar level;
perform a second transformation of said framework to generate a first presentation style for said first grammar level;
obtain a user defined input in said first grammar, said user defined input conforming to said first set of rules and said framework; and
apply said first set of rules and said first presentation style to said user defined input to generate an output in said document, said output conforming to a second grammar level conforming to document rules of an application parser.

16. The computer program product of claim 15, wherein said create a framework comprises:
creating one or more files having grammar definitions conforming to a second set of rules; and
transforming said one or more files into said framework using a second presentation style conforming to said framework.

17. The computer program product of claim 15, wherein said first transformation is in accordance with a third presentation style.

18. The computer program product of claim 15, wherein said second transformation is in accordance with a fourth presentation style.

19. The computer program product of claim 15, wherein said first grammar of said user defined input is extensible.

20. The computer program product of claim 15, wherein said second grammar understood by said application's parser is fixed.

21. The computer program product of claim 15, wherein said data representation language is extensible markup language (XML).

22. An extensible method for simplifying input requirements for user input provided to a computer program comprising:
receiving a schema for a first grammar level;
performing a first transformation of said schema to generate a first set of rules relating to interpretation of said first grammar level;
performing a second transformation of said schema to generate a first presentation style for said first grammar level;
obtaining a user defined input in said first grammar level, said user defined input conforming to said first set of rules and said schema; and
applying said first set of rules and said first presentation style to said user defined input to generate an output in a second grammar conforming to document rules of an application parser.

23. The method of claim 22, wherein said creating a schema comprises:
creating one or more files having grammar definitions conforming to a second set of rules; and
transforming said one or more files into said schema using a second presentation style conforming to said schema.

24. The method of claim 22, wherein said first transformation is in accordance with a third presentation style.

25. The method of claim 22, wherein said second transformation is in accordance with a fourth presentation style.

26. The method of claim 22, wherein said first grammar of said user defined input is extensible.

27. The method of claim 22, wherein said second grammar understood by said application's parser is fixed.

28. The method of claim 22, wherein said data representation language is extensible markup language (XML).

29. An extensible method for simplifying input requirements for user input provided to a document parser, the method comprising:
receiving a schema for a first extensible markup language ("XML") grammar level, wherein the schema conforms to a first document type definition ("DTD");

performing a first transformation of said schema in accordance with a first stylesheet to generate from said schema a second DTD relating to interpretation of said first grammar level;

performing a second transformation of said schema in accordance with a second stylesheet to generate a third stylesheet for said first grammar level;

obtaining a user defined input in said first grammar level, said user defined input conforming to said first DTD and said second DTD; and applying said second DTD and said third stylesheet to said user defined input to generate an output in a second grammar level that conforms to a third DTD used by the parser.

* * * * *